United States Patent [19]

Hearn et al.

[11] Patent Number: 6,099,399

[45] Date of Patent: Aug. 8, 2000

[54] AUTOMATED CRUSTACEAN CLEANING AND CUTTING APPARATUS AND METHOD OF USING SAME

[75] Inventors: Paul Hearn, St. John's; Leslie E. Samson, Mount Pearl; Ernie Reimer; Stephen King, both of St. John's, all of Canada

[73] Assignee: Canpolar East Inc., St. John's Newfoundland, Canada

[21] Appl. No.: 09/086,291

[22] Filed: May 29, 1998

[30]     Foreign Application Priority Data

Jun. 4, 1997 [CA] Canada ................................. 2206678

[51] Int. Cl.[7] ............................................ A22C 29/04
[52] U.S. Cl. ................................ 452/1; 452/12; 452/173
[58] Field of Search .................................. 452/1, 12, 173

[56]     References Cited

U.S. PATENT DOCUMENTS

| | | | |
|---|---|---|---|
| 3,495,293 | 2/1970 | Tolley | 452/1 |
| 3,921,256 | 11/1975 | Huebotter. | |
| 4,073,041 | 2/1978 | Davis et al. | 452/1 |
| 4,293,981 | 10/1981 | Smith | 452/1 |
| 4,479,284 | 10/1984 | Tolley et al. | 452/1 |
| 4,715,093 | 12/1987 | Lapeyre et al. | 452/10 |
| 4,752,988 | 6/1988 | Guguelmo et al. | 452/10 |
| 5,209,176 | 5/1993 | Pompei et al. | 114/222 |
| 5,261,854 | 11/1993 | Eiriksson | 452/19 |
| 5,401,207 | 3/1995 | Hicks et al. | 452/1 |
| 5,580,303 | 12/1996 | Winslow et al. | 452/1 |

FOREIGN PATENT DOCUMENTS

| | | |
|---|---|---|
| 1205963 | 6/1986 | Canada. |
| 1282917 | 4/1991 | Canada. |
| 2015863 | 10/1994 | Canada. |

*Primary Examiner*—Willis Little
*Attorney, Agent, or Firm*—McFadden, Fincham

[57]     ABSTRACT

An automated crustacean processing apparatus provides a scrubbing of crustacean leg portions at high speed and volume and additionally maximizes the amount of leg processable. A cutting arrangement is provided to sever the legs from the body portions with minimum wastage of usable leg material. Asymmetric scrubbing of the upper and lower leg surfaces means that the upper surfaces, which are less debris-laden and feature a commercially significant layer of red colouring receive a less vigorous scrubbing then the leg undersides, which are more debris-laden and do not feature a red layer.

32 Claims, 5 Drawing Sheets

AUTOMATED CRUSTACEAN CLEANING AND CUTTING APPARATUS AND METHOD OF USING SAME

FIELD OF THE INVENTION

The present invention relates to an automated system and method of cleaning and removing crustacean legs from body portions thereof and more particularly, the present invention relates to an apparatus and method for maximizing the efficiency of cleaning and removing crab legs from a body portion of a crab in an expedited manner.

BACKGROUND OF THE INVENTION

Crustacean processing, and more particularly, crab processing, typically involves a washing procedure to remove foreign objects and debris from the outer shell of crab sections. The debris includes slubb, a build-up of slime which is picked up from the sea floor and appears to only occur in catch location with low water levels and leech eggs which are minuscule sized objects which become attached to the underside of the crab legs in densely packed configurations. Typically, the upper sides of the legs are substantially free of such debris. Further, the upper sides are characterized by a layer having a red colour, and it is economically important that this red layer be retained during processing. The undersides are typically white.

Currently, there are a variety of methods for removing such debris and processing the legs for the consumer market. One of the methods involves manually cleaning the crab sections by making use of a hand-held brush. Manual brushing is generally satisfactory and meets quality specifications. The problem is that this method is expensive and labour-intensive. It is estimated that approximately 40 workers are required to scrub 30,000 pounds of crab sections within a typical nine hour workshift.

A further method currently employed involves semi-automated high pressure spray wash systems. The procedure involves passing the crab sections along a perforated conveyor belt. The high pressure water (approximately 1,000 psi) is blasted through the conveyor belt from a nozzle system beneath the conveyor. This procedure is rife with limitations, including:

(1) a loss of product yield due to the high pressure stream impinging on exposed meat in a butchered cavity;
(2) worker intervention to flip the crab sections over to facilitate access and cleaning both sides of the crab;
(3) excessive water consumption;
(4) power consumption;
(5) significant maintenance costs for the equipment employed; and
(6) removal of layer of red colouring from upper sides of crab legs.

A further method for processing the crab sections includes manually sawing the crab legs. This method is, as well, affected by limitations such as significant product yield loss and significant labour intervention for positioning the crab for the sawing operation.

In view of the limitations currently being experienced in this art, there exists a need for an automated arrangement for processing the crab or other crustacean sections which can be more efficient and less expensive in terms of financial commitment and labour requirements. The present invention alleviates the limitations in the prior art and accordingly, one object of the present invention is to provide a highly efficient processing apparatus and a method of employing the apparatus.

In one aspect of one embodiment of the present invention, there is provided an automated apparatus for cleaning and separating the legs from a body portion of a crustacean, comprising:

conveyor means for conveying a body portion of a crustacean having legs;

cleaning means for cleaning the crustacean legs, the cleaning means cooperative with the conveyor means;

cutting means for cutting cleaned legs from the body portion; and means for removing the body portion remaining on the conveyor means subsequent to cutting.

The conveyor apparatus conveniently includes an endless loop of spaced apart hooks. The hooks are particularly useful to be positioned between the legs of the crab section at the underside of the body portion to which the legs are connected. This facilitates easy loading of the conveyor hooks by the operator. The hooks are preferably vertically disposed so that the legs are pendulant. It has also been found that by providing a conveyor such as that employed herein, cleaning of the conveyor is a much less difficult procedure than that which would be attributed to the spray bar conveyor system discussed herein previously.

The cleaning means may comprise a cleaning station that incorporates rotatable brushes for contact with the legs, with the conveyor being preferably inclined relative to the rotating brushes. It has been found that as the conveyor advances the crab sections forwardly and upwardly through the counter rotatable brushes of the cleaning station, more effective cleaning is achieved. This occurs as a result of the crab sections being advanced through a positive inclination along the brushes and therefore the legs are progressively scrubbed from directly adjacent the body portion to the tip of the legs prior to severing the legs from the body portion. As will be appreciated, this facilitates scrubbing and ensures that substantially all of the debris is removed from the legs prior to severance from the body. The result is a much more desirable product which is inherently more vendible.

The counter rotatable brushes may be independently driven or may have an indirect linkage to the conveyor. This will depend upon the size of the apparatus and other user requirements.

Turning to the brushes, the same preferably extend a substantial distance along the length of the conveyor and either side of the hooks of the conveyor such that the legs pass between the brushes as the crustaceans are conveyed. The spacing between the brushes and the brush stiffness will be such that the legs are somewhat tensioned as they are scrubbed to achieve effective scrubbing and further, to maximize the amount of leg length prior to the cutting operation. In this manner, a maximum amount of leg length results to increase the product yield and the economy of the method. As well, the downward tensioning assists the severing operation.

Excessive abrasion of the leg by the brushes can have the undesirable effect of removing an excessive amount of desirable red colouring layer from the upper sides of the crab leg sections. It is desirable to provide a means whereby the upper, red side experiences a more gently brushing or abrading than the lower white side. This may be accomplished by means of the counter-rotatable brushes comprising a first, harder brush positioned to scrub the white undersides and a second, softer brush positioned to scrub the delicate and less soiled upper sides of the legs.

In accordance with a further aspect of the present invention there is provided an automated apparatus for separating the legs from a body portion of a crustacean, comprising:

an endless loop conveyor of individual hooks in spaced relation for receiving the legs and a body portion;

drive means for driving the loop, a cleaning station for receiving and cleaning the legs, the cleaning station including at least a pair of counter rotatable brushes for scrubbing the legs and simultaneously applying tension to the legs during rotation of the brushes;

a cutting member for cutting the legs from the body portion; and at least one rotatable member for removing body portions remaining subsequent to a cutting operation.

In order to manage the waste from the process, the apparatus includes a member for removing body portions that remain subsequent to a cutting operation. Advantageously, the individual hook portions of the conveyor facilitate simple removal of the body portion into a collecting bin or container. One embodiment of an apparatus for removing the body portions from the hooks of the conveyor comprises a rotatable brush for dislodging the body portion from the hooks. This form of the apparatus not only serves to dislodge the body portion, but also cleans the hooks of the conveyor for reloading.

In a further embodiment the counter rotatable brushes consist of first and second brushes, with the first brush having relatively soft bristles for contact with the red upper sides of the legs and the second brush having relatively stiff bristles for contact with the undersides of the crustacean legs. In use, the crustaceans are positioned on the conveyor such that the undersides of the legs substantially all face the first brush. Preferably, there is also provided anti-bias means positioned to directly or indirectly contact the legs as they pass between the brushes, to counterbalance the biassing effect of the first brush, which exerts as it contacts the legs a greater force against the legs than the second brush. The anti-bias means permits the legs to be positioned for generally even contact with the brushes as the brushes rotatably contact the legs.

The method of practising the present invention has been found to significantly reduce labour involvement and financial requirements and accordingly, in a further aspect of one embodiment of the present invention, there is provided a continuous method for separating crustacean legs from a portion body of the crustacean, comprising the steps of:

conveying, with a conveyor, the crustacean legs into contact with cleaning means:

removing surface debris from the legs with the cleaning means;

applying tension to the legs simultaneously during cleaning; and cutting the legs under tension to separate the legs from the body portion.

In a further embodiment, the crustaceans are positioned on the conveyor such that the upper sides of the legs substantially face in a first direction and the undersides face in a second direction. The cleaning means apply a more forceful cleaning operation to the undersides and a less forceful cleaning operation to the upper sides.

Having thus described the invention, reference will now be made to the accompanying drawings illustrating preferred embodiments, and in which:

Similar numerals denote similar elements.

Figure 1:
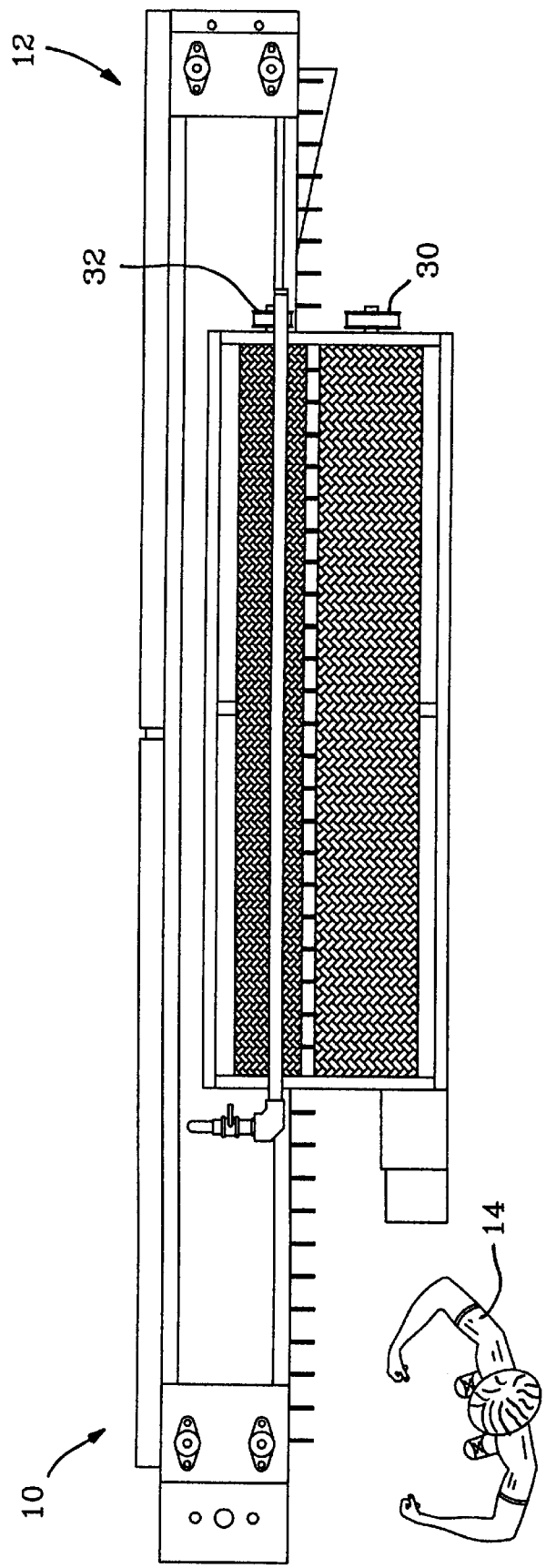
FIG. 1 is a top plan view of the apparatus according to one embodiment.

Referring now to the drawings, FIG. 1 illustrates a top plan overall view of a first embodiment of the apparatus globally denoted by numeral 10. The apparatus 10 comprises an elongate conveyor generally denoted by numeral 12 which is operated by a single operator, denoted by numeral 14.

Figure 2:
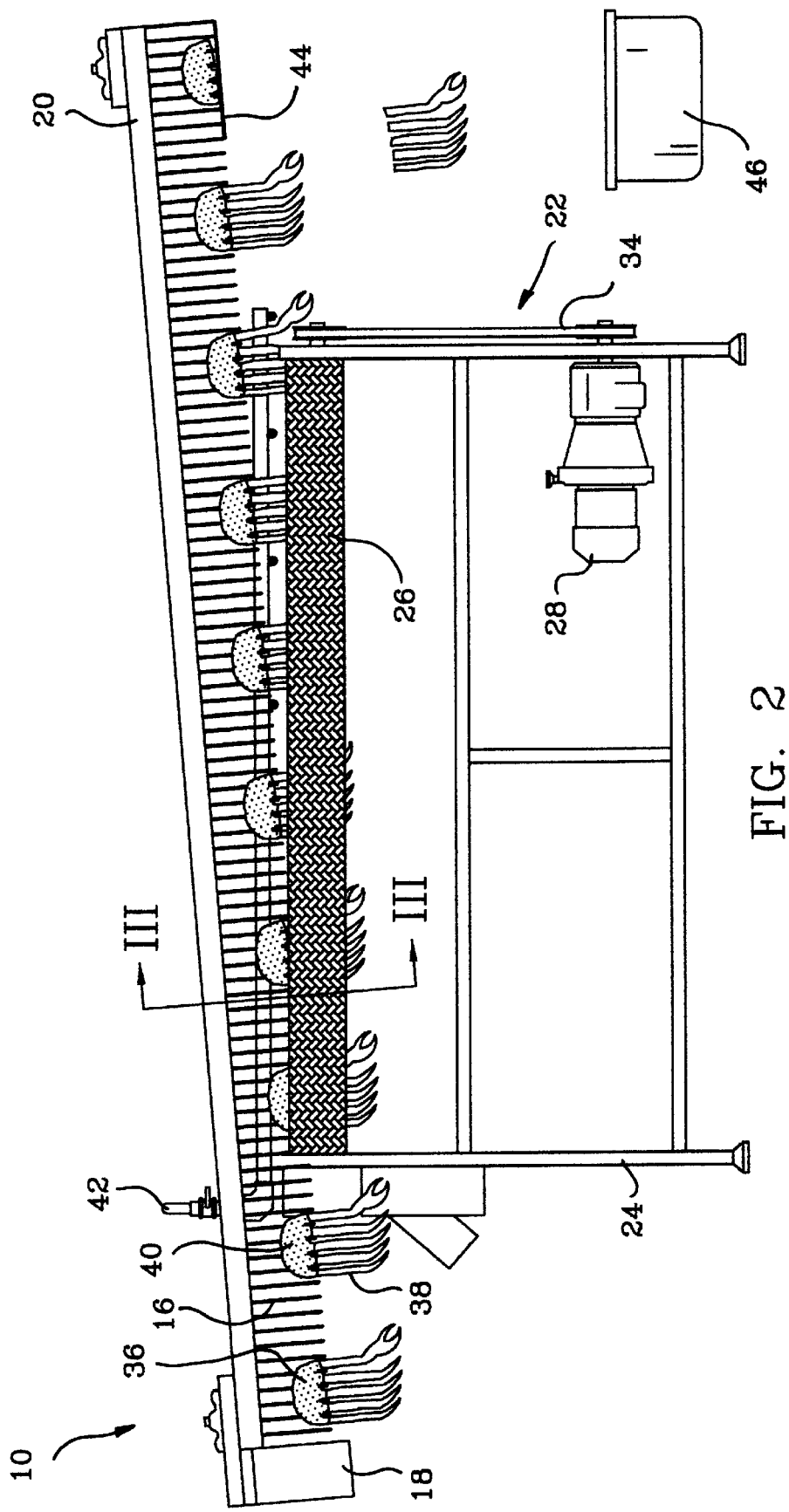
FIG. 2 is a side view of FIG. 1.

FIG. 2 illustrates a side elevational view of the apparatus 10 in greater detail. The conveyor 12 comprises an endless loop of hooks 16 which are mounted to a typical chain drive. The chain drive (not shown) is driven by a drive motor 18 at one end of the apparatus 10 by a drive sprocket (not shown). The conveyor 12 provides an idler pulley motor 20 having a pulley (not shown) for receiving the chain drive. The conveyor 12 is mounted in cooperative relation to a cleaning station 22, the cleaning station 22 including a supporting frame 24. The cleaning station 22 provides a pair of counter rotating brushes 26 rotatably driven by motor 28. Motor 28 imparts rotation to sprockets 30 and 32 (shown more clearly in FIG. 1) by a chain or belt 34 communicating between motor 28 and sprockets 30 and 32. The brushes 26 are positioned in relatively close relation and are positioned between the hooks 16 of conveyor 12.

Figure 3:
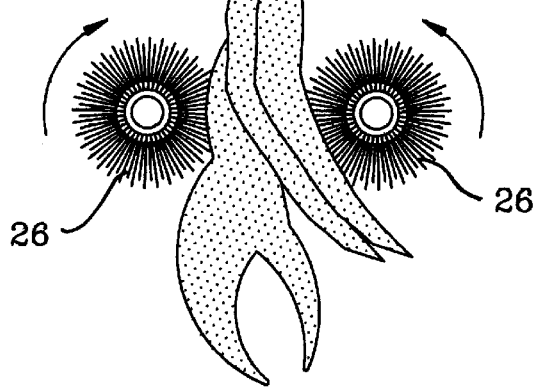
FIG. 3 is a sectional view along line 3—3 of FIG. 2.

The relationship referred to herein above with respect to the brushes 26 is more clearly illustrated in FIG. 3. The brushes 26 are particularly adapted for removing debris and unwanted material from crab portions 36 having legs 38 and body portions 40 positioned on the hooks 16 of conveyor 12. The brushes 26 are spaced to effectively scrub the legs 38 of the crab portions 36. The brushes 26 of cleaning station 22 are substantially horizontal relative to the disposition of the conveyor 12. It has been found that if the conveyor 12 is disposed at an angle relative to the brushes 26 from about 5° to about 40° relative to the brushes, the legs 38 of the crab portions 36 are progressively cleaned from the body portions 40 through to the tips of the legs 38. In order to assist further with the removal of debris (not shown), the cleaning station 22 may include a water dispenser 42 for rinsing the crab portions 36 as they pass through the brushes 26.

As the crab portions 36 pass longitudinally along the counter rotating brushes 26 by way of the action of the conveyor 12, the brushes 26 impart a tension to the legs 38 such that the same are slightly elongated while in position on hooks 16. This procedure is not only useful to ensure positive scrubbing of the legs 38, but also prepares the portions 36 for cutting while maximizing the effective length of leg to be cut thus avoiding unnecessary wastage and enhancing the product yield for the amount of leg 38 removed.

Figure 4:
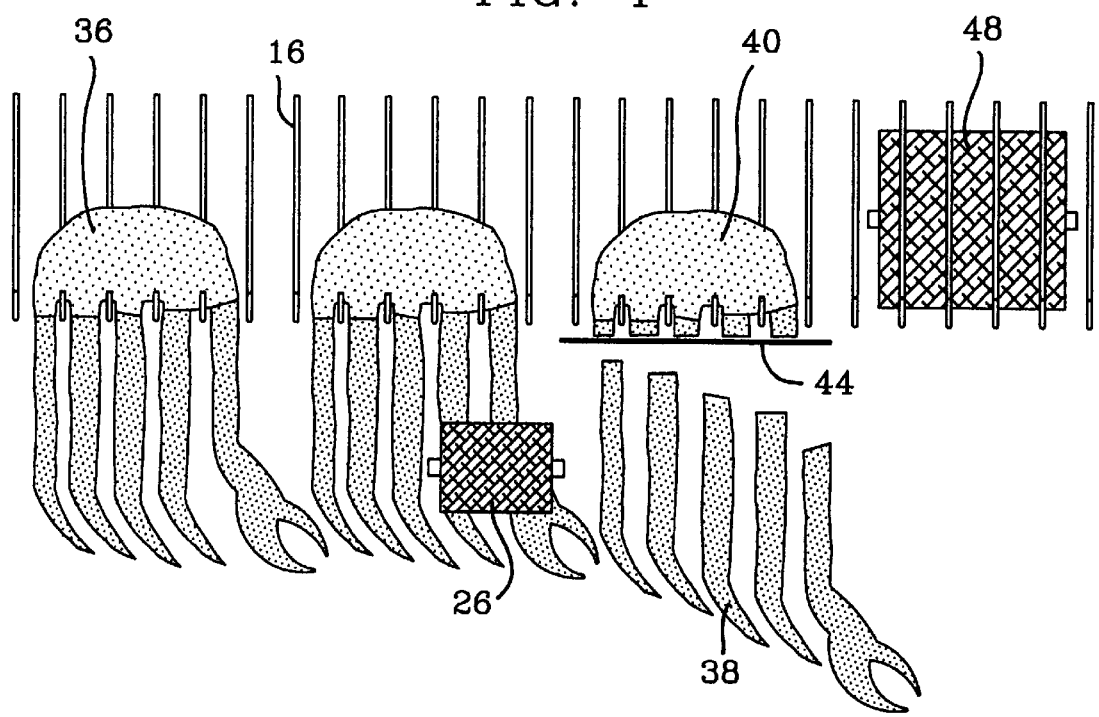
FIG. 4 is an enlarged view of the cutting operation of the present invention.

FIG. 4 illustrates the final stages of the operation prior to cutting the legs 38 from the body portions 40. Once the legs 38 have been tensioned, a cutting mechanism 44 (shown schematically in FIG. 4 and more clearly in FIG. 2) severs the legs 38 from the body portion 40. The free legs 38 are then collected in a suitable container 46. The cutting mechanism 44 may comprise a circular saw, band saw or other suitable cutting mechanism, conveniently positioned between and under brushes 26.

Regarding the body portion 40, the same remain on hooks 16 of conveyor 12 until such time as they are moved into location for contact with a dislodging member 48. The dislodging member 48, in the example, comprises a rotatable brush selectively movable between adjacent hooks 16. The brush rotates and effectively lift to dislodge the body portions 40. The dislodged body portions are then collected in a suitable container (not shown).

The arrangement discussed herein is subject to substantial variation. It will be readily appreciated by those skilled in the art that the longitudinal brushes 26 may be separate, longitudinally disposed brushes or be segmented into several different brushes. Additionally, there may be a plurality of pairs of brushes depending upon the size of the apparatus 10 and intended volume of product to be processed.

Further possible variations on the apparatus would include a reversal of the angular relationship between the brushes 26 and the conveyor 12. In this manner, the brushes 26 may be angularly disposed relative to a substantially horizontal conveyor system without any detriment to the efficiency of the apparatus or method of employment.

Figure 5:
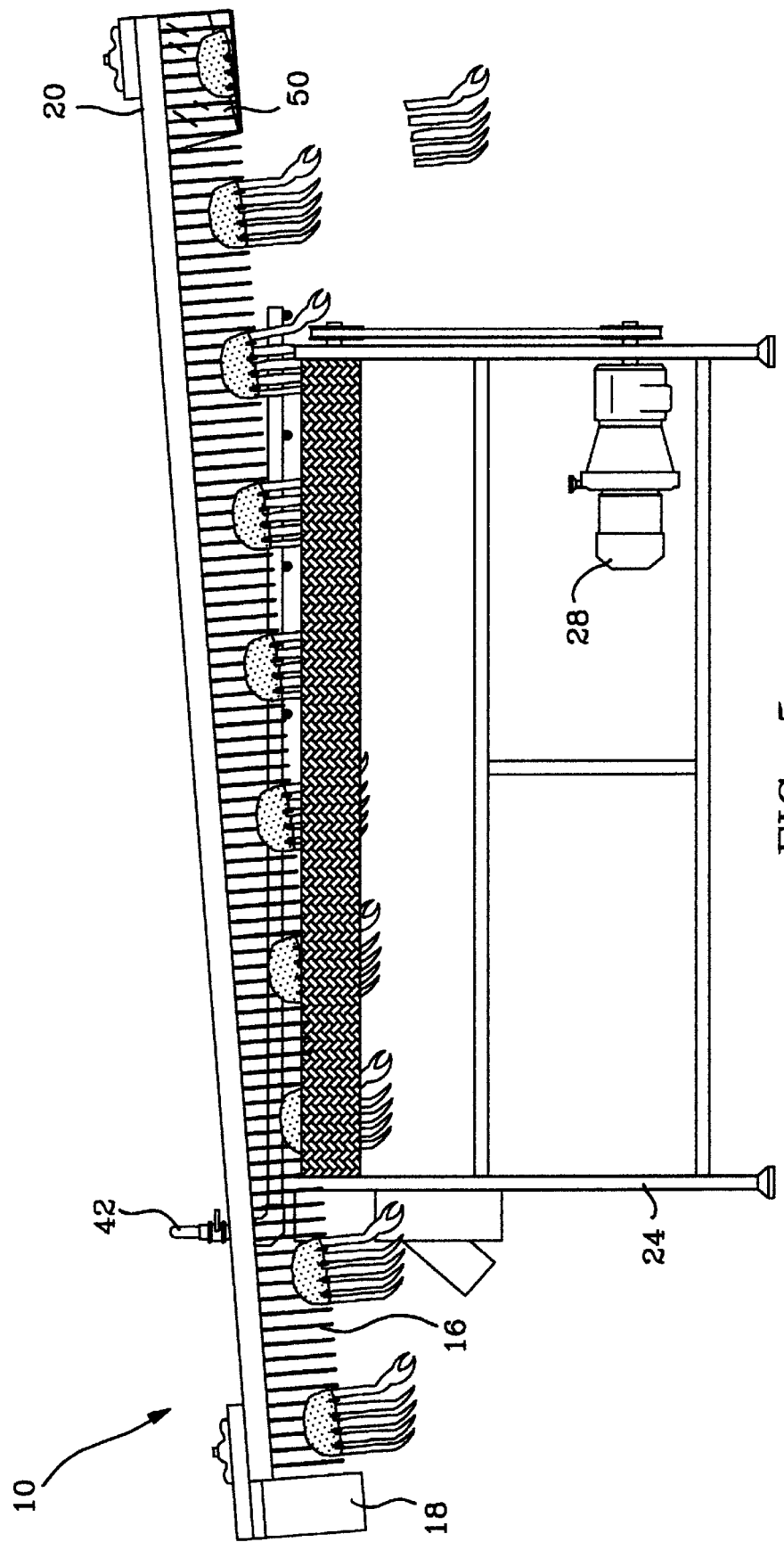
FIG. 5 is a similar view to FIG. 2 illustrating a further embodiment.

As a variation from FIG. 2, FIG. 5 illustrates an embodiment of the apparatus 10 where a discharge chute 50 is positioned in place of cutting mechanism 44. This embodiment would be useful where the user does not intend to sever the legs from the body portions, but rather simply requires the legs to be cleansed by brushes 26 and the crab portion 36 eventually removed by dislodging member 48. The discharge chute 50 would then be useful to collect dislodged portions 36.

Figures 6, 7:
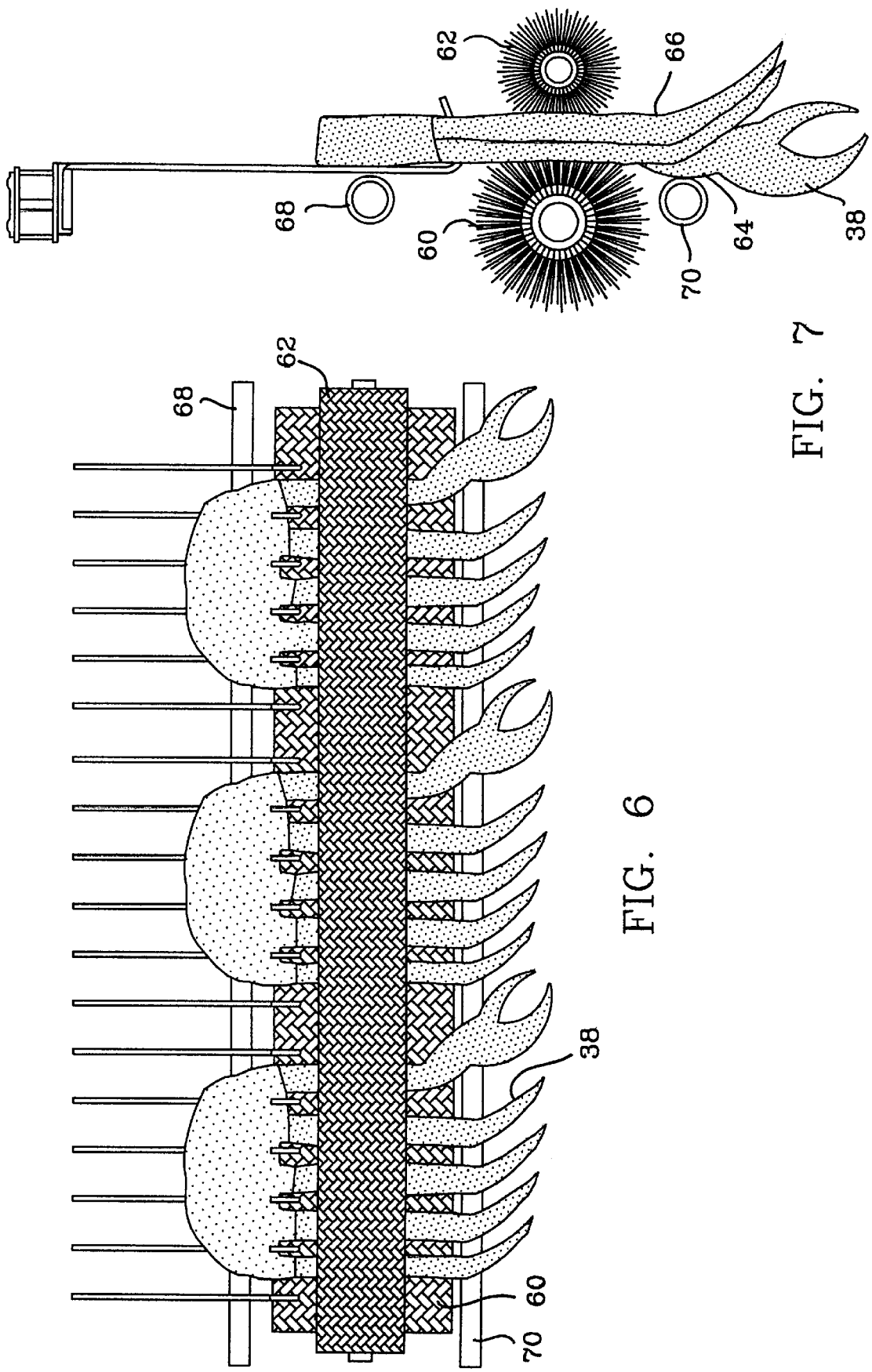
FIG. 6 is a side elevational view of a still further embodiment of the apparatus.
FIG. 7 is a front view of the embodiment of FIG. 6, showing a portion of the apparatus.

FIGS. 6 and 7, illustrate an embodiment of the invention comprising first and second elongate, counter rotating brushes 60 and 62, respectively. In this variation, the first brush 60 comprises relatively soft bristles and the second brush 62 comprises relatively hard bristles and may have a smaller diameter than the first brush. In use, crabs are positioned on the hook conveyor such that substantially all of the red, upper sides 64 of the legs 38 face the soft first brush and the white undersides 66 face the hard second brush. In this manner, the white undersides, bearing a greater concentration of debris, receiver a harder scrubbing while the red upper sides, bearing less debris but a dedicate red layer, receive a more gentle scrubbing. As a result of the difference in bristle stiffness, the second brush bears down harder on the legs than the first brush as the brushes rotate. In order to maintain sufficient contact with the second brush and to prevent the legs from being pushed into the first brush, anti-bias means directly or indirectly contact the legs. The anti-bias means comprise upper and lower spaced apart parallel guide rails 68 and 70 respectively, positioned parallel to and above and below, respectively, the soft first brush. The upper guide rail is positioned to be slidingly contacted by the lower ends of the hook conveyors as they travel along the device, while the lower guide rail is positioned to be slidingly contacted by the lower ends of the crab leg sections. Together, the guide rails provide a backstop that supports the legs and their accompanying hooks, to maintain the crab leg sections in a generally vertical orientation, and for effective brushing contact with both brushes.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. An automated apparatus for cleaning and separating the legs from a body portion of a crustacean, comprising:

conveyor means for conveying a body portion of a crustacean having legs;

cleaning means for cleaning said crustacean legs, said cleaning means cooperative with said conveyor means and including at least a pair of counter rotatable brushes adapted to receive said legs therebetween for debris removal;

cutting means for cutting cleaned legs from said body portion; and means for removing said body portion remaining on said conveyor means subsequent to cutting.

2. The apparatus as set forth in claim 1, wherein said conveyor means comprises an endless loop of individual hooks in spaced relation.

3. The apparatus as set forth in claim 2, wherein said hooks are vertically disposed.

4. The apparatus as set forth in claim 1, wherein said cleaning means further includes rinsing means for rinsing loosened debris from said legs.

5. The apparatus as set forth in claim 1, wherein said brushes, during rotation, simultaneously effect a tension on said legs to elongate said legs.

6. The apparatus as set forth in claim 1 wherein said conveyor forms an angle of about 5° to about 40° with said brushes.

7. The apparatus as set forth in claim 2, wherein said means for removing said body portions comprises a rotatable dislodging member for dislodging residual body portions from said hooks.

8. The apparatus as set forth in claim 7, wherein said dislodging member comprises a rotatable brush.

9. The apparatus as set forth in claim 1, wherein said counter rotatable brushes comprise first and second brushes, said first brush having relatively soft bristles and said second brush having relatively hard bristles, said first brush for contact with the upper sides of said crustacean legs and said second brush for contact with the undersides of said crustacean legs.

10. The apparatus as set forth in claim 9, wherein there is further provided anti-biassing means for direct or indirect contact with said crustacean legs, for maintaining effective brushing contact of said crustacean legs with said first and second brushes.

11. The apparatus as said forth in claim 10, wherein the said anti-biassing means comprises at least one rail extending generally the length of said conveyor means, adjacent and parallel to said first brush, for sliding contact with said legs or said conveyor means.

12. The apparatus as set forth in claim 11, wherein said anti-biassing means comprises upper and lower spaced apart parallel rails.

13. An automated apparatus for separating the legs from a body portion of a crustacean, comprising:

an endless loop conveyor of individual hooks in spaced relation for receiving said legs and body portion;

drive means for driving said loop;

a cleaning station for receiving and cleaning said legs, said cleaning station including at least a pair of counter rotatable brushes for scrubbing said legs and simultaneously applying tension to said legs during rotation of said brushes;

a cutting member for cutting said legs from said body portion; and at least one rotatable member of removing body portions remaining subsequent to a cutting operation.

14. The apparatus as set forth in claim 13, wherein said endless loop conveyor is inclined relative to said cleaning station such that said conveyor diverges upwardly away from said brushes of said cleaning station.

15. The apparatus as set forth in claim 13, wherein said brushes comprise discrete elongate brushes extending from about 10 percent to about 60 percent of the length of a side of said conveyor.

16. The apparatus as set forth in claim 14, wherein said conveyor forms an angle of from about 5° to about 40° with said brushes of said cleaning station.

17. The apparatus as set forth in claim 13, wherein said counter rotatable brushes comprise first and second brushes, said first brush having relatively soft bristles and said second brush having relatively hard bristles, said first brush for contact with the upper sides of said legs and said second brush for contact with the undersides of said legs.

18. The apparatus as set forth in claim 17, wherein there is further provided anti-sway means for direct or indirect contact with said crustacean legs, for maintaining effective brushing contact of said crustacean legs with said first and second brushes.

19. The apparatus as said forth in claim 18, wherein the said anti-sway means comprises at least one rail extending generally the length of said conveyor means, adjacent and parallel to said first brush, for sliding contact with said legs or said hooks.

20. The apparatus as set forth in claim 19, wherein said anti-sway means comprises upper and lower spaced apart parallel rails.

21. A continuous method for separating crustacean legs from a portion body of said crustacean, comprising the steps of:

conveying, within a conveyor, said crustaceans legs into contract with cleaning means, said cleaning means comprising at least a pair of counter rotatable brushes adapted to receive said legs therebetween;

removing surface debris from said legs with said cleaning means;

applying tension to said legs simultaneously during cleaning; and cutting said legs under tension to separate said legs from said body portion.

22. The method as set forth in claim 21, wherein said step of conveying includes suspending said body portion from hook conveying means to allow said legs to be pendulant.

23. The method as set forth in claim 22, wherein said hook conveying means are interdigitated with said legs.

24. The method as set forth in claim 21, wherein said brushes, during rotation, effect downward tension on said legs to maximize the length of leg available for cutting.

25. The method as set forth in claim 24, wherein said cutting comprises simultaneously cutting all legs from said body portion.

26. The method as set forth in claim 25, further including removing residual body portions remaining in said conveyor subsequent to cutting said legs.

27. The method as set forth in claim 21, further including the step of progressively scrubbing the length of said legs as said legs are advanced by said conveyor along said brushes.

28. The method as set forth in claim 21 further including the step of rinsing said legs while brushing.

29. The method as set forth in claim 21, further including the step of collecting body portions following said cutting.

30. The method as set forth in claim 21, further including the step of collecting cut legs.

31. The method as set forth in claim 21, wherein said legs are positioned on said conveyor such that the upper sides of substantially all of said legs face in a first direction, and the undersides of said legs face in a second opposing direction, and a first of said brushes is adapted to apply a relatively hard brushing action to said undersides and a second of said brushes is adapted to apply a relatively a soft brushing action to said upper sides.

32. The method as set forth in claim 31, further comprising the step of supporting said legs with a anti-sway means to maintain said legs generally in effective brushing contact with said brushes.

* * * * *